Figure 1:
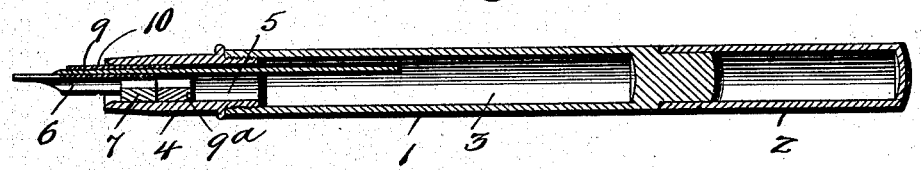

No. 723,112. PATENTED MAR. 17, 1903.
P. E. WIRT.
FOUNTAIN PEN.
APPLICATION FILED JAN. 16, 1902.
NO MODEL. 4 SHEETS—SHEET 1.

Witnesses
T. L. Mockerson
G. S. Roy

Inventor
Paul E. Wirt,
by S. T. Wolhaupter
Attorney

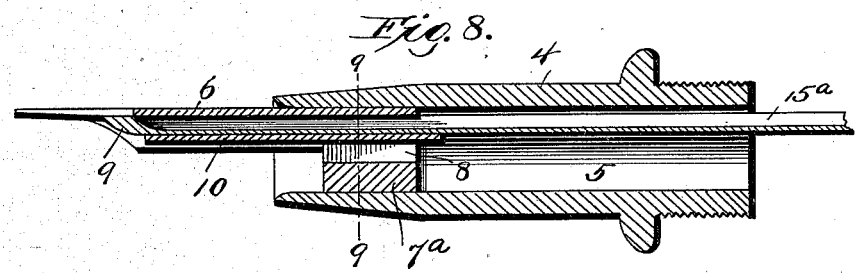
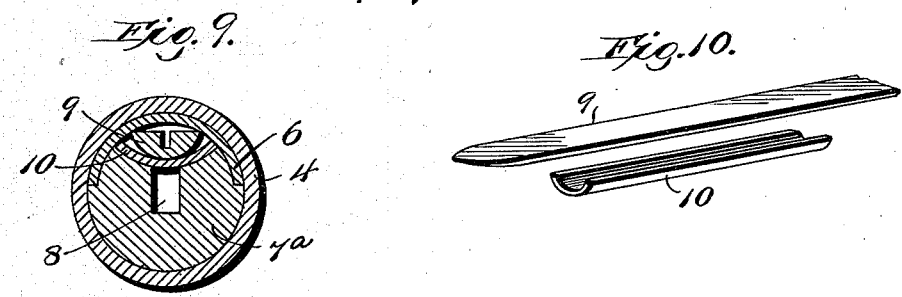
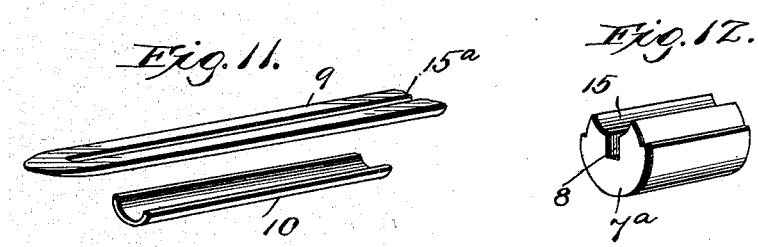
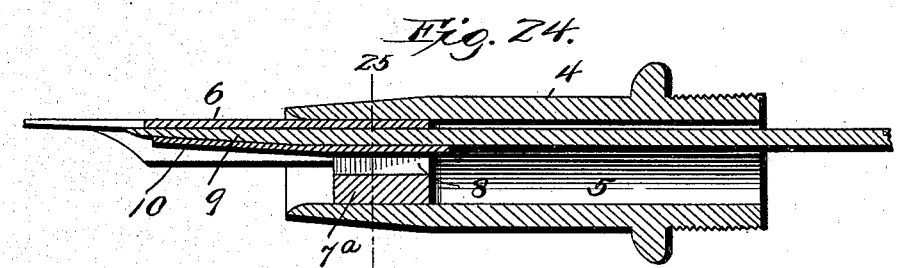
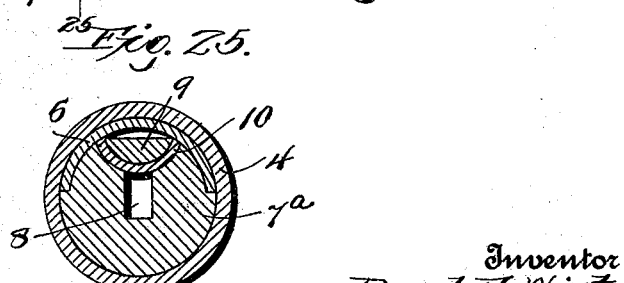

No. 723,112. PATENTED MAR. 17, 1903.
P. E. WIRT.
FOUNTAIN PEN.
APPLICATION FILED JAN. 16, 1902.
NO MODEL. 4 SHEETS—SHEET 3.
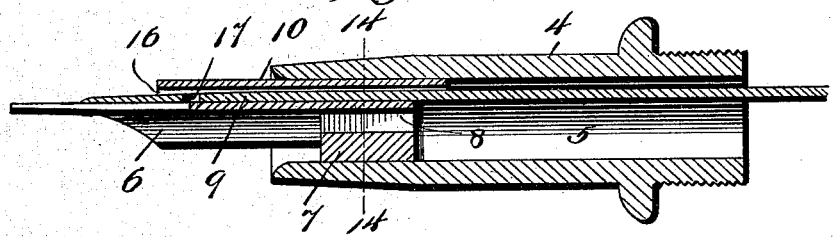
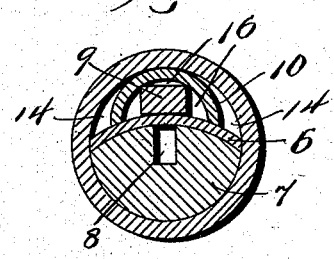
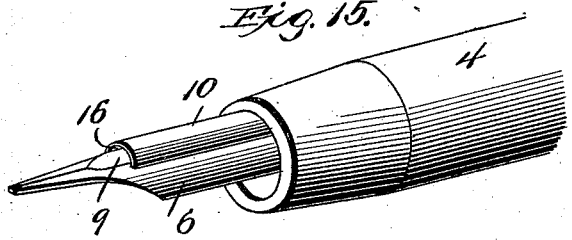
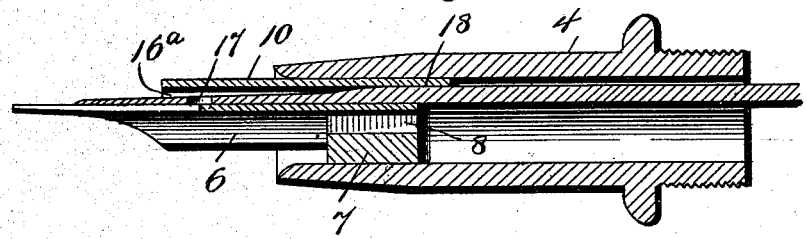
Witnesses
T. L. Mockabu
G. S. Roy
Inventor
Paul E. Wirt,
by S. T. Wolhaupter
Attorney

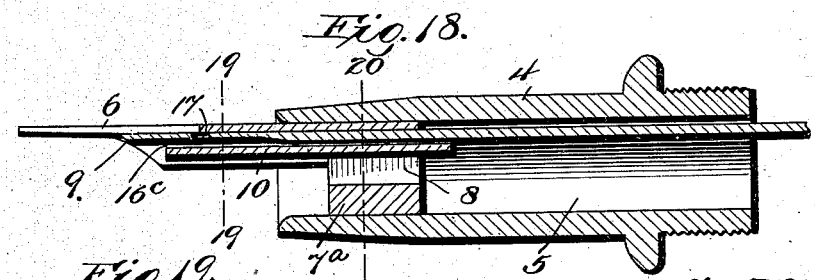
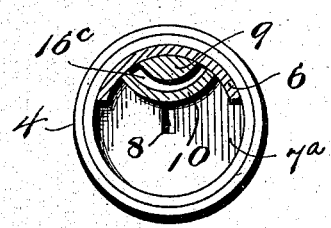
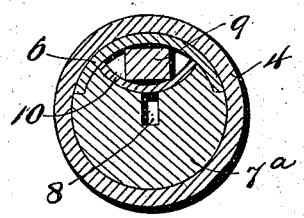
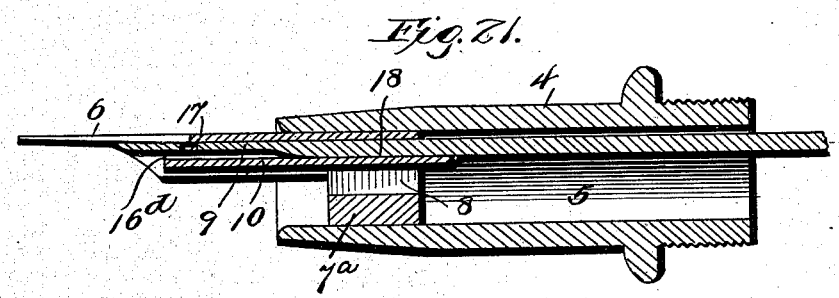
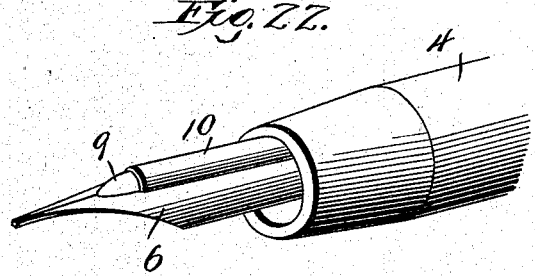
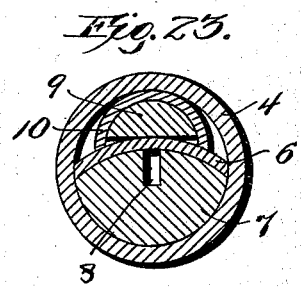

UNITED STATES PATENT OFFICE.

PAUL E. WIRT, OF BLOOMSBURG, PENNSYLVANIA.

FOUNTAIN-PEN.

SPECIFICATION forming part of Letters Patent No. 723,112, dated March 17, 1903.

Application filed January 16, 1902. Serial No. 90,061. (No model.)

*To all whom it may concern:*

Be it known that I, PAUL E. WIRT, a citizen of the United States, residing at Bloomsburg, in the county of Columbia and State of Pennsylvania, have invented certain new and useful Improvements in Fountain-Pens, of which the following is a specification.

This invention relates to fountain-pens, more especially to that type in which the flow of ink is controlled principally by capillary attraction, and has special reference to an improvement in the feeding means for such pens.

To this end the invention has particularly in view the provision of means, in connection with the main feeder or feeding device of a fountain-pen, for securing greater cleanliness about the feeder or feeding device, whether over or under the pen-point, not only upon the projecting portion of the feeder, but also especially about that portion thereof which lies just within the mouth or orifice of the pen-bearing section or nozzle within which the pen-point is held.

To those familiar with fountain-pens and the use thereof it is well known that just within the nozzle and about the pen and its feeder ordinarily the ink will dry when the pen is not in use, with the result that an incrustation or sediment is formed about the inner and outer surfaces which necessarily materially interferes either with the flow of the ink or the operation of the pen. This is, in fact, a very common objection which is made to many types of fountain-pens, so it is the purpose of the present invention to primarily make suitable provision whereby sediment or deposit of solid matter will not so readily form at the mouth of the pen-bearing section and up within the passage-way of the latter, so as to obstruct the flow of the ink. In this connection the invention provides what might be properly termed a "self-cleansing feeder," which permits the pen to clean itself better when through using, and therefore necessarily provides a pen which operates at all times more readily and better and which always remains in a clean and operative condition about the internal orifice, air-passages, and along the external projecting portions.

In the accomplishment of the foregoing principal objects the invention also provides a permanent cleaner attachment not only effecting the self-cleansing function or action indicated, but also materially improving the appearance of the fountain-pen at the pen-bearing end thereof, besides involving an arrangement of parts wherein the attachment or cleaner element may effectually perform the function of auxiliary or supplemental feeding means, as well as a protective sheath, guard, or fender for the main feeder or feed-bar, especially when the latter is of the thin, narrow, or exceedingly flexible form.

With these and many other objects in view, which will more readily appear as the nature of the invention is better understood, the same consists in the novel construction, combination, and arrangement of parts, which will be hereinafter more fully described, illustrated, and claimed.

The fundamental feature of the invention resides in a non-corrodible outer sheath, covering, or lining for a fountain-pen feeder capable of effecting in a practical way the objects stated. This improvement is necessarily susceptible to embodiment in a variety of ways, both in connection with the top-feed or under-feed pen and also in association with various forms of construction within and about the pen-bearing section without departing from the spirit or scope of the invention. However, for illustrative purposes a few of the simpler and preferred embodiments of the invention are shown in the accompanying drawings, in which—

Figure 2:
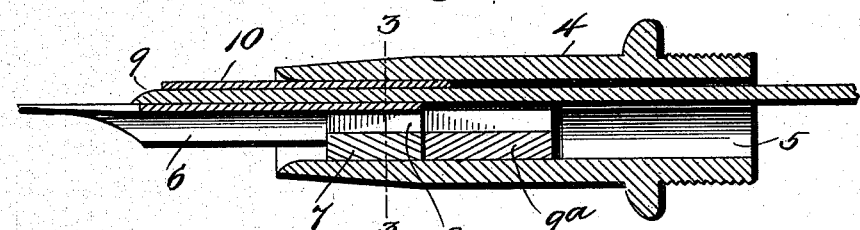
Figure 3:
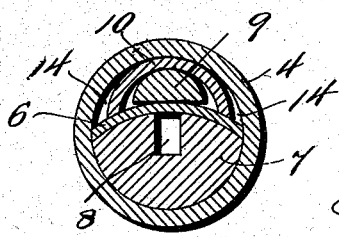
Figure 4:
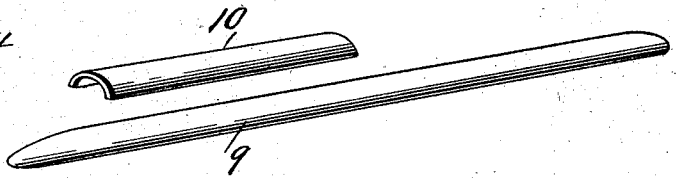
Figure 5:
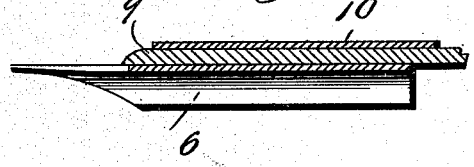
Figure 6:
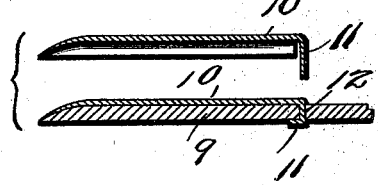
Figure 7:
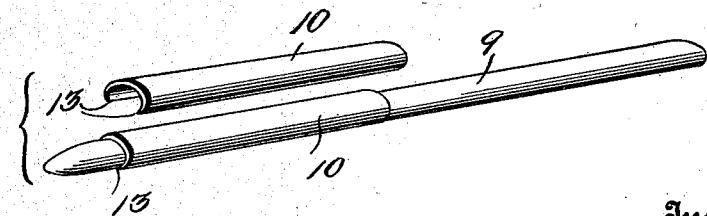

Figure 1 is a longitudinal sectional view of a fountain-pen of the top-feed type—such, for instance, as shown in my pending application, Serial No. 75,406, filed September 14, 1901, and illustrating the feeder, feed shaft, or tongue, having associated therewith a feeder-sheath, such as contemplated by the present invention. Fig. 2 is an enlarged sectional view of the same construction and illustrating the pen-bearing section and the feeder parts associated therewith. Fig. 3 is a cross-sectional view on the line 3 3 of Fig. 2, illustrating more plainly the novel relation between the feeder and the sheath constituting the outer covering or lining therefor. Fig. 4 is a detail perspective view showing a "top" feeder, feed bar or shaft, and a metallic sheath, covering, or lining therefor separated. Fig. 5 is an enlarged detail sectional view showing the operative relation between the pen-point, the feeder, and the feeder-sheath in a top-feed pen of the type illustrated in Fig. 1. Fig. 6 is a detail sectional view illustrating a modification in which the external feeder-sheath may cover the whole external surface of the projecting portion of the feeder and also may have a separate interlocking connection with the feeder, so as to positively prevent displacement of the parts. Fig. 7 is a similar detail view indicating the variation that may be resorted to in the matter of providing a separate interlocking connection for the sheath, should this be desired. Fig. 8 is an enlarged sectional view, similar to Fig. 2, of the pen-bearing section, showing the feeder-sheath improvement applied to the feeder, feed-bar, or feed-tongue of an "under-feed" fountain-pen. Fig. 9 is a cross-sectional view on the line 9 9 of Fig. 8. Fig. 10 is a view similar to Fig. 4, showing the feeder of the under-feed pen and the outer sheath therefor separated. Fig. 11 is a similar view to Fig. 10, illustrating the feeder or feed-bar of the under-feed pen provided with a separate capillary channel, duct, or fissure, illustrating the fact that the feeder-sheath may be associated with a feeder embodying capillary feeding means of any character. Fig. 12 is a detail perspective of the form of pen-holding plug illustrated in Figs. 8 and 9 of the drawings. Fig. 13 is an enlarged view of the pen-bearing section similar to Fig. 12, showing a top-feed pen fitted with an outer feeder-sheath, spaced sufficiently over the feeder which it covers to provide about the main feeder or feeding-shaft a well-defined supplemental feeding-channel through which ink flows and is consolidated upon the nibs of the pen-point, with the stream or capillary flow drawn from the reservoir in the usual way by the capillary spaces, fissures, or channels between the pen-point and the feeder itself. Fig. 14 is a cross-sectional view on the line 14 14 of Fig. 13. Fig. 15 is a detail in perspective of the pen-bearing section of the pen embodying the arrangement of parts shown in Figs. 13 and 14. Fig. 16 is a detail in perspective of the form of feeder or feed-bar which may advantageously be associated with the construction suggested in Figs. 13, 14, and 15. Fig. 17 is a view similar to Fig. 13, indicating a sufficient space between the feeder-sheath and its feeder to provide a well-defined storage-space for flow or overflow about and around the outer end of the feeder or feeding-shaft, which space, however, does not communicate with the ink-supply in the reservoir to serve as an auxiliary or supplemental feed. Fig. 18 is a view similar to Fig. 13, showing the supplemental feeding idea applied to an under-feed pen. Fig. 19 is a cross-sectional view on the line 19 19 of Fig. 18. Fig. 20 is a similar view on the line 20 20 of Fig. 18. Fig. 21 is a view similar to Fig. 17 with the same thought associated with an under-feed pen. Fig. 22 is a detail perspective view of a top-feed type of pen, illustrating a form in which the feeder-sheath clasps the feeder so tightly as to serve only as a cleaner and protective attachment. Fig. 23 is a cross-sectional view through the pen-bearing section of the construction shown in Fig. 22. Figs. 24 and 25 are longitudinal and cross-sectional views, respectively, showing the same thought as suggested in Fig. 22 of a close-fitting sheath as applied to an under-feed pen.

Like reference-numerals designate corresponding parts throughout the several views of the drawings.

It has already been indicated that the improvement contemplated by the present invention is applicable to all types of fountain-pens involving a feeder in the form of a feeding bar, shaft, or tongue usually lying next to the pen-point and extending into the reservoir to provide for controlling the flow of ink to the nibs by capillary attraction. Also the improvement, which is in the nature of what might be termed a "cleaner" attachment, is obviously applicable to either the top or under feed pen wherein the feeder or feeding-bar lies, respectively, on the upper or lower side of the pen-point.

Inasmuch as hard-rubber shafts, bars, or equivalent elements have by practical experience been found more reliable as attractive surfaces to draw ink downward, the present invention contemplates preserving the advantageous results secured by the use of a rubber or equivalent feeder, while at the same time providing an outer or external surface for such feeder, to which ink will not readily cling or dry thereon. In its broadest aspect the invention therefore comprehends a feeder having an outer or external self-cleansing surface, which obviates the difficulties experienced in the ordinary pens, wherein incrustation or sediment frequently forms about the feeder and also within the mouth of the pen-bearing section, so as to obstruct the flow of ink. In a more specific sense the invention may be carried out by providing a non-corrodible polished outer feeder-sheath constituting an external covering or lining for the rubber feeder, feeding bar, shaft, or tongue. This feeder-sheath may, if desired, cover the entire external surface of the projecting portion of the feeder up to the pen-point and as far up within the rim of the pen-bearing section or nozzle as may be found desirable and advantageous. However, irrespective of the particular extent of the feeder-sheath or the particular manner of associating it with the feeder and its related parts, the principal object in thus covering or lining the feeder, whether of the top-feed or under-feed type of pen, is to secure greater cleanliness about the feeder, both upon the outer projecting portion and the part which is disposed just within the mouth of the pen-bearing section or nozzle within which the pen is held. Polished gold presents all the qualities necessary for carrying out every object of the invention, as polished metal seems to afford a surface to which the ink will not cling so readily and dry thereon. Consequently with a feeder-sheath made of polished gold or equivalent non-corrodible material the pen parts are kept cleaner, both inside and out, and the pen cleans itself better when through using, with the consequence of operating at all times more readily and also constantly remaining cleaner about the internal fissures, air-passages, and along the external projecting portion of the feeder. In another aspect the non-corrodible polished feeder-sheath provides exteriorly where no attraction is required a surface to which the ink will not cling and deposit sediment thereon, so as to interfere with the operation of the pen. Besides the important utility of the polished-metal sheath, covering, or lining to provide what might be properly termed a "self-cleaning" feeder or feed-bar the improvement also performs several other important and useful functions, which will be more fully explained in connection with the description of the embodiments of the invention shown in the drawings and to which drawings particular reference will now be made.

A comprehensive understanding of the invention and its many advantages is exemplified by the series of related Figs. 1, 2, and 3, illustrating the sheath as applied to a top-feed pen of the type shown in my pending application, Serial No. 75,406, aforesaid. Referring to these figures of the drawings, the numeral 1 designates the tubular holder of the ordinary form, with which is associated the usual cap 2 and which provides the interior ink-reservoir 3 of required capacity for holding a supply of ink. The holder 1 necessarily carries at its lower or feeding-out end a pen-bearing section or nozzle of some form; but for illustrative purposes this pen-bearing section (designated by the numeral 4) is shown as of the detachable form and having the usual bore or passage-way 5, which is in direct communication with the interior reservoir 3 and practically constitutes the lower part of such reservoir. The pen-bearing section 4 receives in the outer or lower end thereof the pen-point 6, which in the construction shown is held in place by a pen-holding plug 7. This pen-holding plug constitutes a closure for the lower end of the pen-bearing section, besides acting as a holding element for detachably fastening the pen-point in position and also serving as a means for admitting air into the reservoir, which means may consist in simply providing the said plug with an air-vent 8, piercing the same. In this construction the pen-holding plug 7 also preferably coöperates with the top feeder or feed-bar 9, and with the latter is also shown associated an impulse check or dam 9ª; but as this particular combination and relation of elements is not important to the carrying out of the present invention and are fully set forth in my application aforesaid reference is only made thereto herein for illustrative purposes.

In the top-feed pen just described, as well as in all other forms of pen to which the invention may be applied, the feeder 9 consists, preferably, of a rubber feed bar, shaft, or tongue extending longitudinally through the pen-bearing section or nozzle and having the inner end thereof projecting into the main supply-reservoir. In the top-feed pen the outer end of the feeder 9 projects within the pen-bearing section and extends over and on the top of the pen-point to the nibs of the latter. The said feeder may or may not be provided with auxiliary feeding-channels, spaces, or fissures so long as the same effects the necessary capillary attraction for drawing the ink downward upon the pen-point. In the construction just described the essential feature of the present invention—namely, the feeder-sheath, covering, or lining—is designated by the numeral 10. The sheath 10 is preferably of semitubular or concavo-convex form, so as to fit over and constitute a complete outer covering or lining for the feeder 9, extending entirely about the outer or external surface thereof and fitting over the side portions as well as the top thereof in the top-feed type of pen. The semitubular sheath 10 is also of any length desired, according to the projection desired within and without the pen-bearing section or nozzle and also according to whether it is desired for the same to cover the whole external surface of the projecting portion of the feeder or only a part thereof, as indicated in Fig. 2 of the drawings. In the preferable forms of the invention the feeder-sheath 10 is made of non-corrodible polished metal, so as to afford a surface to which ink will not readily cling or dry thereon. Various expedients may be resorted to for fastening the feeder-sheath in position. In the construction shown in Figs. 2 and 3 of the drawings simply the wedging action is relied upon to hold the sheath in place, while at the same time permitting of its ready removal and replacing with other parts of the pen; but should it be found advantageous to provide a more positive and direct connection between the sheath and the feeder which it covers separate fastening or interlocking means may be utilized—such, for instance, as suggested in Figs. 6 and 7 of the drawings. In Fig. 6 of the drawings the feeder-sheath 10 is illustrated as provided at one end with a locking-tongue 11, adapted to be clenched through an opening 12 in the feeder or feed-bar 9, and also in the said Fig. 6 of the drawings the feeder-sheath 10 is illustrated as extending over the full length of the outlying portion of the feeder to the extreme lower end thereof. In Fig. 7 of the drawings is suggested another variation of positive fastening means for the feeder-sheath, this latter modification consisting in providing the sheath 10, at the longitudinal side edges thereof, with inturned holding-flanges 13, engaging beneath the bottom edges of the feeder or feed-bar. Irrespective of the manner in which the sheath is held in place or the extent thereof when applied to the top-feed pen, as shown and described, the same prevents the ink drying about the feeder and especially within the pen-bearing section or nozzle at the mouth thereof, thus insuring a better cleaning of the pen when through using and serving to preserve the internal fissures and air-passages clear and in working condition at all times. In the type of pen described where a rubber feeder or shaft is used for feeding purposes the capillary channel for drawing the ink downward is usually confined between the feeder and the pen; but, as may be plainly seen from Fig. 3 of the drawings, the feeder-sheath 10 when fitting reasonably loose necessarily provides supplemental auxiliary feeding-channels between itself and the feeder or feed-bar, which supplemental or auxiliary channels assist in drawing the ink downward in proper quantity to the nibs of the pen. However, it will be obvious, as suggested in Figs. 22, 23, 24, and 25 of the drawings, the sheath may fit the feeder or feed-bar so closely as to subserve only its principal functions as a cleaner and as a protective covering or guard for the feeder. Also in the use suggested in Figs. 2 and 3 of the drawings the semitubular form of the sheath 10 necessarily provides within the pen-bearing section between the latter and the sheath supplemental air vents or passages 14, through which air may pass upwardly into the reservoir in connection with the relief of air which passes through the vent 8 of the pen-holding plug 7.

The invention as applied to an under-feed fountain-pen performs the same functions and has the same utility as already described in connection with the application to a top-feed pen. The use of the invention in connection with an underfeed pen is shown in Figs. 8 to 12, inclusive, of the drawings. In these figures of the drawings the parts are designated by the same reference characters, as the only difference resides in the feeder or feed-bar shaft or tongue lying at the under side of the pen-point instead of at the top, although it is necessary to provide the pen-holding plug 7ª, in the upper side thereof, with a longitudinal seat or concavity 15, fitting over the semitubular feeder-sheath 10, which extends entirely about the sides and bottom surfaces of the said feeder. Also, like in the construction already described, the feeder may or may not be provided with separate capillary grooves, fissures, or channels, such as 15ª. (See Fig. 11.) It is only essential, as already stated, that capillary spaces of some sort be properly provided about the feeder for drawing from the ink-supply in the reservoir and delivering the ink to the nibs of the pen-point.

Various modifications of the invention may be resorted to to meet different conditions, and yet such different conditions may have added functions for the feeder-sheath. For instance, where a thin, narrow, or small and very flexible feeder or feed-bar is employed, particularly on the top side of the pen, as suggested in Figs. 13, 14, and 15 of the drawings, the feeder sheath, lining, or covering acts in the capacity of a protective guard or fender, which prevents breakage, displacement, or other accidents to the feeder. It will be obvious to those familiar with the art that under some conditions it may be desirable to employ a feed-bar sufficiently thin and flexible at its outer projecting portion so as to not interfere with the flexure of the nibs, and especially where the feeder is on top of the pen the smooth polished metallic sheath or covering will necessarily be quite useful as a protective means or medium for the feeder. Of course this would to a great extent apply to the protection by the sheath of a feeder or feed-bar located at the under side of the pen.

Another aspect of the invention is amplified by the illustrations of Figs. 13 to 16, inclusive, of the drawings. In these figures of the drawings the feeder-sheath 10 is illustrated as spaced sufficiently from the feeder, which it covers and protects, to provide a well-defined supplemental feeding-channel 16 about the feeder and in communication with the ink-supply of the reservoir. To render this supplemental feeding-channel 16 especially useful, the outlying portion of the feeder directly over the pen-point may be provided with a circulating opening 17, which in the construction described will necessarily serve to carry ink from the supplemental channel 16 to the nibs of the pen, consequently serving to concentrate upon the nibs of the pen the capillary streams from the reservoir respectively flowing beneath the feeder and on top of the same. However, should it be desired to not utilize an auxiliary or supplemental flow, such as contemplated by the construction shown in Figs. 13 to 16, a tight fit may be provided for the inside end of the sheath, as at the point 18 shown in Fig. 17 of the drawings, so that any space between the sheath and the feeder which it covers does not communicate with the ink-supply in the reservoir. Nevertheless in this modification shown in Fig. 17 the ink-circulating opening 17 within the feeder may still be employed, if desired. Such opening through the feeder upon its outlying portion would be of advantage as a means to more readily combine and hold or retain the ink-supply upon the nibs of the pen, at the same time not permitting it to drop off so readily and blot. Hence a well-defined space 16ª may be provided between the sheath and the feeder, as shown in Fig. 17, as a storage or overflow space to accommodate a superfluous flow of ink from the reservoir and retain the same within the sheath and about the feeder until written off. This over-supply space 16ª consequently receives and retains superabundant ink at the nibs of the pen, and this function thereof is necessarily equally applicable to the top or under feed pens.

The explanations already made are emphasized by the construction shown in Figs. 18, 19, and 20, in which the thought suggested in Figs. 13 to 16, inclusive, of the drawings are embodied in a pen of the under-feed type. With the parts arranged as shown in Figs. 18 to 20 space is provided between the sheath and under the feeder or feed-bar to secure a supplemental feeding-channel 16ᶜ, while in Fig. 21 the idea of an overflow or storage space 16ᵈ, such as suggested in Fig. 17, is illustrated as embodied in connection with a pen of the under-feed type. The construction in these several forms is exactly the same when shown respectively applied to the top and under side of the pen, according as the same may be designed as a top feed or an under feed.

In Figs. 22 and 23 of the drawings there is illustrated a top-feed pen in which the feeder-sheath hugs or clasps the feeder or feed-bar so tightly as to serve principally as a cleaner and protective attachment and confining the capillary flow between the sheath and the feeder. The reverse of this arrangement is shown in Figs. 24 and 25 of the drawings, in which the close-fitting sheath or covering is illustrated as applied to the feeder of an under-feed pen.

Various other modifications may obviously be resorted to, and as the use and many advantages of the improvement have already been fully set forth. it is thought the invention will be fully understood without further description.

Having thus described the invention, what is claimed, and desired to be secured by Letters Patent, is—

1. In a fountain-pen, the combination with the holder carrying the pen-point, of the feeding means including an element having an outer face exposed outside of the holder and provided with a polished non-adherent surface.

2. In a fountain-pen, the combination with the holder carrying the pen-point, of the feeding means including an element having an exposed face outside of the holder and provided with a non-corrodible non-adherent metallic surface.

3. In a fountain-pen, the combination with the feeding means including an element having an external portion outside of the holder, of an outer non-adherent lining for the exposed face of said external portion.

4. In a fountain-pen, the combination with the feeding means including an element having an external portion outside of the holder, of an outer metal lining for the exposed face of said external portion.

5. In a fountain-pen, the combination with the feeding means including an element having an external portion extending outside of the holder, of a non-corrodible lining for the outer exposed face of said external portion, said lining having a polished surface.

6. In a fountain-pen, the combination with the feeding means including an element having an external portion extending outside of the holder, of a non-corrodible metallic lining for the outer exposed face of said external portion, said lining having a smooth polished non-adherent surface.

7. In a fountain-pen, the combination with the feeding means including an element having an external portion outside of the holder, of a polished gold lining for the outer exposed face of said external portion.

8. In a fountain-pen, the combination with the feeding means including an element having an exposed portion, for the pen-point outside of the holder, of an outer lining for said exposed portion, such lining also being disposed within the mouth of the pen-bearing section or nozzle.

9. In a fountain-pen, the combination with the feeding means including an element lying next to the pen-point, and an outer metallic non-corrodible lining for said element disposed within and without the pen-bearing section or nozzle and provided with a polished surface.

10. In a fountain-pen, the combination with the pen-bearing section and the pen-point, of the feeding means including an element having an external exposed portion outside of the holder, and a semitubular lining for the outer face of the said exposed portion, the said lining having an external polished surface.

11. In a fountain-pen, the combination with the pen-bearing section and the pen-point, of the feeding means including an element having an external exposed portion outside of the holder, and a semitubular metallic lining arranged about the outer surface of said exposed portion and also disposed within the mouth of the pen-bearing section or nozzle, said lining having an external polished surface.

12. In a fountain-pen, the combination with the holder carrying the pen-bearing section, of the feeding means including an element having an external exposed portion outside of the holder, and a lining for the exposed face of said external portion, said lining having an exterior non-adherent polished surface, and arranged to provide in connection with said feeder element supplemental feeding means.

13. In a fountain-pen, the combination with the holder carrying the pen-bearing section, of the feeding means including an element extending outside of the holder, a metallic non-corrodible lining covering the exposed face of the exposed portion of the feeder element, said lining having a smooth surface and arranged to provide between itself and the said feeder element a supplemental feeding-channel.

14. In a fountain-pen, the combination with the holder carrying the pen-bearing section, of the feeding means including an element extending outside of the holder, a metallic non-corrodible lining covering the exposed face of the exposed portion of the feeder element, said lining having a smooth surface arranged to provide between itself and the said feeding element a supplemental channel, and means for concentrating the separate capillary streams upon the pen-point at the nibs thereof.

15. In a fountain-pen, the combination with the reservoir-holder carrying the pen-bearing section, of the feeding means including an element extending outside of the holder provided with an opening at or contiguous to the nibs of the pen-point, and a lining for the exposed side of the exposed portion of the feeder element, said lining having a smooth surface and arranged to provide an ink-space in communication with the opening through the said feeder element.

In testimony whereof I affix my signature in presence of two witnesses.

PAUL E. WIRT.

Witnesses:
R. L. ORANGE,
C. W. FUNSTON.